United States Patent [19]

Hoch et al.

[11] 4,286,094
[45] Aug. 25, 1981

[54] PREPARATION OF A PIGMENTARY FORM OF PERYLENE-3,4,9,10-TETRACARBOXYLIC ACID DIIMIDE

[75] Inventors: Helmut Hoch; Heinrich Hiller, both of Wachenheim, Fed. Rep. of Germany

[73] Assignee: BASF Aktiengesellschaft, Fed. Rep. of Germany

[21] Appl. No.: 69,546

[22] Filed: Aug. 24, 1979

[30] Foreign Application Priority Data

Aug. 30, 1978 [DE] Fed. Rep. of Germany ....... 2837731

[51] Int. Cl.³ .................... C07D 471/06; C09B 3/18
[52] U.S. Cl. ..................................... 546/37; 8/657; 106/287.21
[58] Field of Search ......................................... 546/37

[56] References Cited

U.S. PATENT DOCUMENTS

| 1,506,545 | 8/1924 | Schmidt | 546/37 |
| 3,615,800 | 10/1971 | Spietschka | 106/288 Q |
| 3,752,686 | 8/1973 | Kalz | 106/288 Q |
| 3,976,649 | 8/1976 | Fabian | 106/288 Q |

FOREIGN PATENT DOCUMENTS

| 276357 | 6/1913 | Fed. Rep. of Germany . |
| 386057 | 12/1923 | Fed. Rep. of Germany . |
| 1115711 | 4/1962 | Fed. Rep. of Germany . |
| 1142339 | 4/1964 | Fed. Rep. of Germany . |
| 1914208 | 11/1970 | Fed. Rep. of Germany . |
| 1619531 | 2/1971 | Fed. Rep. of Germany . |
| 2063714 | 6/1972 | Fed. Rep. of Germany . |
| 2316536 | 10/1974 | Fed. Rep. of Germany . |
| 861218 | 2/1961 | United Kingdom . |
| 1293042 | 10/1972 | United Kingdom . |

OTHER PUBLICATIONS

BIOS, Final Report #1484, p. 21.

Primary Examiner—Mark L. Berch
Attorney, Agent, or Firm—Oblon, Fisher, Spivak, McClelland & Maier

[57] ABSTRACT

A process for the preparation of pigmentary forms of perylene-3,4,9,10-tetracarboxylic acid diimide, wherein the diimide is converted to the leuco compound and the latter is oxidized in aqueous suspension, either with exposure to shearing forces in the presence of surfactants, or in the absence of shearing forces and in the presence of non-ionic surfactants, or of mixtures of non-ionic and anionic surfactants.

The perylenetetracarboxylic acid diimide pigments give deep, brilliant and transparent full-shade colorations. In white reductions, they give distinctly reddish colorations.

11 Claims, No Drawings

PREPARATION OF A PIGMENTARY FORM OF PERYLENE-3,4,9,10-TETRACARBOXYLIC ACID DIIMIDE

The present invention relates to a process for the preparation of pigmentary forms of perylene-3,4,9,10-tetracarboxylic acid diimide, which give transparent reddish colorations of high brilliance.

Perylene-3,4,9,10-tetracarboxylic acid diimide hereafter also referred to simply as diimide-is, by virtue of its exceptional degree of fastness, a valuable colorant for surface coatings and plastics.

German Pat. No. 1,115,711 discloses that diimide obtained from the process of synthesis cannot be converted to tinctorially valuable pigmentary forms by the conventional dry and wet milling processes disclosed in the literature or by dissolving in, and reprecipitating from, sulfuric acid. The reason for this failure is that the finely divided diimide, on drying, forms stable aggregates and agglomerates which are not broken up during the conventional processes for coloring of surface coatings and plastics.

According to German Pat. No. 1,115,711, this disadvantage is overcome by subjecting the finely divided diimide, which is still moist with water, to azeotropic distillation in order to remove the water, then heating it in a high-boiling solvent with strict exclusion of moisture, and thereafter isolating the pigmentary form. The pigment thus obtained is alleged to exhibit exceptional tinctorial strength and brilliance in, for example, plasticized PVC.

German Pat. No. 1,142,339 discloses that the disadvantage of the pigmentary forms obtained by prior art processes can be circumvented by mixing the aqueous finely divided diimide with from 5 to 30, preferably from 10 to 20, % by weight, based on diimide, of one or more oil-soluble polar compounds and drying the mixture.

According to German Laid-Open Application DOS No. 1,619,531, the processes described in German Pat. Nos. 1,115,711 and 1,142,339 give products which exhibit relatively low tinctorial strength and a dull hue, coupled with a matt surface, when used in surface coatings or in plastic compositions. A further disadvantage of the diimide pigment obtained in accordance with German Pat. No. 1,142,339 is said to reside in the oil-soluble polar compounds added, which restrict the use of the product in the surface coating sector.

According to German Laid-Open Application DOS No. 1,619,531, a tinctorially valuable pigmentary form is obtained if diimide obtained in accordance with the conventional processes is milled at up to 50° C., in organic solvents which are inert under the process conditions, using small milling particles such as quartz beads or steel slot, until the optimum tinctorial strength is achieved.

A tinctorially particularly advantageous pigmentary form is alleged to be obtained if the starting imide has been prepared from perylenetetracarboxylic acid or its bis-anhydride and ammonia or ammonium chloride at 120° to 125° C.

Further, according to German Laid-Open Application DOS No. 1,619,531 the crude imides obtained by fusing naphthalene-1,8-dicarboxylic acid imide with caustic alkali can advantageously be recrystallized from sulfuric acid, or stirred with hot concentrated sulfuric acid, in order to purify them.

German Laid-Open Application DOS No. 2,063,714 discloses that a very brilliant, light-fast and weatherfast pigmentary form of diimide is obtained by milling with common salt or sodium sulfate in the presence of a higher aliphatic amine.

German Laid-Open Application DOS No. 1,914,208 describes milling the crude diimide with common salt or sodium sulfate in the presence of a $C_{10}$-$C_{16}$-fatty alcohol.

A further process for the preparation of pigmentary forms of the diimide is described in German Laid-Open Application DOS No. 2,316,536. In this process, the crude diimide is first brought to a finely divided state by milling in a ball mill, whereby the crystal structure is substantially destroyed. This milled material is then treated with an aliphatic or aromatic primary amine, a heterocyclic base or a carboxylic acid amide, whereupon recrystallization occurs and the pigmentary form is produced. According to that DOS, the diimide pigments obtained have a very high tinctorial strength, and exhibit a bluer hue, and better dispersibility, than the conventional pigmentary forms. The pigments obtained give high-hiding colorations.

The prior art processes entail expensive finishing steps or entail pretreatments. Some of the processes suffer from ecological disadvantages, as, for example, in the case of milling with salt, or again for ecological reasons, require expensive solvent recovery installations.

With the exception of the pigments obtained according to German Laid-Open Applications DOS Nos. 1,914,208 and 1,619,531, the diimide pigments obtained by the prior art processes give hiding and, in some cases, dull colorations.

It is true that the pigment obtained according to German Laid-Open Application DOS No. 1,914,208 gives transparent colorations, but these are very bluish and dull.

The process described in German Laid-Open Application DOS No. 1,619,531 gives a pigment which yields pure, transparent colorations if the crude diimide used as the starting material has been prepared by reacting perylenetetracarboxylic acid or its dianhydride with ammonia or ammonium chloride at from 120° to 125° C. The perylenetetracarboxylic acid, or its dianhydride, used as the starting material is obtained by hydrolysis of perylenetetracarboxylic acid diimide in concentrated sulfuric acid at above 200° C. This means that the pigmentary form described in German Laid-Open Application DOS No. 1,619,531 entails complicated and therefore expensive process steps.

The present invention seeks to provide a process by means of which perylenetetracarboxylic acid diimide obtained by alkali fusion of naphthhalimide can be converted into a pigmentary form which, in full shade formulations, exhibits high transparency coupled with a very pure hue which is substantially redder than that of the prior art pigmentary forms and which, if possible, is suitable for the preparation of metallic finishes.

It would also be desirable to provide a process which is very cheap and does not pollute the environment.

We have found that perylene-3,4,9,10-tetracarboxylic acid diimide can be obtained in an advantageous pigmentary form giving brilliant, transparent and reddish colorations if crude perylenetetracarboxylic acid diimide is converted to the leuco compound and the latter is then oxidized in an aqueous suspension either with exposure to shearing forces in the presence of a surfactant at from 20° to 100° C. or in the absence of shearing forces and in the presence of a non-ionic sufactant or of a mixture of a nonionic and an anionic surfactant at from 40° to 100° C.

The process according to the invention gives a diimide pigment which yields deep, brilliant and transparent colorations. For example, full-shade colorations of baking finishes exhibit high transparency and high brilliance. In white reductions, the hue is substantially redder than with prior art pigmentary forms. Furthermore, the diimide pigment obtained by the process according to the invention is easily dispersible in printing inks, surface coatings and plastics.

This result was surprising since, according to German Pat. No. 1,115,711, column 1, lines 23–24, the diimide cannot be converted to a finely divided form by vatting and re-oxidizing, because the leuco compound is sparingly soluble, and the products obtained by vatting and re-oxidizing give only dull and unusable colorations.

The process according to the invention is in general carried out by first vatting the diimide in aqueous suspension by means of alkali metal dithionite in the presence of an alkali metal hydroxide, whereupon the leuco compound precipitates as the alkali metal salt.

The vatting of the diimide is carried out in aqueous suspension, in general in from 20 to 60 parts by weight of water per part by weight of diimide. The amount of alkali metal dithionite, preferably sodium dithionite, employed is suitably from 0.5 to 1 part by weight per part by weight of diimide. The amount of alkali metal hydroxide, eg. sodium hydroxide or potassium hydroxide, is advantageously from 0.5 to 2.0 times the amount of dithionite. Vatting is as a rule carried out at from 10° to 90° C., preferably from 20° to 60° C.

The reduction is in general complete after from 0.5 to 3 hours. The leuco compound can be processed further either directly or after having been isolated from the suspension. On isolating the leuco compound, soluble by-products (impurities) present in the solution are removed, so that purification can be achieved by isolation. The isolated leuco compound can additionally be washed with blank vat (i.e. an aqueous solution of alkali metal dithionite and alkali metal hydroxide) at 20° to 40° C. The blank vat used may be, for example, a solution which contains about 10 parts by weight of sodium hydroxide and about 10 parts by weight of sodium dithionite in 1,000 parts by weight of water.

The perylene-3,4,9,10-tetracarboxylic acid diimide used as a starting material may have been prepared by conventional methods (cf., for example, German Pat. No. 276,357, BIOS Final Report No. 1,484, page 21, German Pat. No. 386,057 and German Laid-Open Application DOS No. 1,619,531).

It is a particular advantage of the present process that crude diimide produced industrially by alkali fusion of naphthalimide can be used, since the diimide can be purified, at the leuco compound stage, by isolating and washing it.

The diimide obtained from this method of synthesis can also be purified, for example, by stirring it with hot concentrated sulfuric acid. If purified diimide is used, the intermediate isolation and washing of the leuco compound of the diimide can be dispensed with.

The leuco form is oxidized, in aqueous suspension, either with exposure to shearing forces in the presence of a surfactant at from 20° to 100° C. or in the absence of shearing forces and in the presence of a non-ionic surfactant or of a mixture of a non-ionic and an anionic surfactant at from 40° to 100° C.

A particularly transparent, reddish and easily dispersible pigmentary form is obtained by oxidizing the leuco compound in the presence of a surfactant with exposure to shearing forces, and this embodiment of the process is therefore preferred.

The shearing forces are generated in the aqueous suspension by milling particles, such as glass balls, ceramic balls, metal balls, plastic balls or sand, which are agitated by a high-speed stirrer. Examples of suitable equipment are sand mills and bead mills. The amount of milling particles is in general from 20 to 40 parts by weight per part by weight of the leuco compound. As a rule, from 10 to 60 parts by weight of water are used per part by weight of diimide.

The oxidation can be effected by introducing air into the mixture during milling or by adding oxidizing agents during and/or after milling.

Suitable oxidizing agents are atmospheric oxygen, oxidizing salts, eg. nitrates and chlorates, dilute oxidizing acids, eg. 20–40% strength by weight nitric acid, nitro compounds, eg. nitrobenzenesulfonic acid, and hydrogen peroxide and its adducts, eg. with borates or with sodium carbonate.

Since the oxidation takes place particularly rapidly with hydrogen peroxide and its adducts, and the pigmentary form produced is particularly transparent, these oxidizing agents are preferred.

The oxidation with exposure to shearing forces is in general carried out at from 20° to 100° C., preferably from 40° to 80° C.

Especially suitable surfactants for this embodiment are anionic or non-ionic surfactants, used in an amount which is in general from 0.2 to 20, preferably from 0.5 to 15, % by weight, based on the leuco compound.

Examples of suitable anionic surfactants are alkali metal salts or ammonium salts of $C_{13}$–$C_{18}$-paraffinsulfonic acids, $C_{13}$–$C_{18}$-paraffindisulfonic acids, di-$C_1$–$C_4$-alkyl sulfosuccinates, sulfonated oleic acid dibutylamide, $C_8$–$C_{18}$-alkylbenzenesulfonic acids, e.g. octyl-, nonyl-, decyl-, hexadecyl- and dodecyl-benzenesulfonic acid, mono-and di-$C_3$–$C_8$-alkylnaphthalene-2-sulfonic acid, condensation products of naphthalene-2-sulfonic acid and formaldehyde, condensation products of phenolsulfonic acid, urea and formaldehyde, N-$C_{12}$–$C_{18}$-alkyl-N-methyl-aminoacetic acids, $C_{16}$–$C_{20}$-fatty acids, of abietic acid, of rosin, of hydrogenated rosin or of dimerized rosin, or mixtures of these.

Examples of suitable non-ionic surfactants for the process according to the invention are fatty alcohols of 12 to 16 carbon atoms, N-(hydroxy-$C_2$–$C_4$-alkyl)-amides of $C_{16}$–$C_{20}$-fatty acids, adducts of ethylene oxide with fatty acids of 16 to 20 carbon atoms, with $C_{16}$–$C_{20}$ fatty acid amides, with $C_{12}$–$C_{20}$-alkanols, with primary $C_{12}$–$C_{20}$-alkylamines, with $C_8$–$C_{20}$-alkylphenols, with monoglycerides of fatty acids, with N-(hydroxy-$C_2$–$C_4$-alkyl)-amides of $C_{16}$–$C_{20}$-carboxylic acids or with rosin, or mixtures of these products. The molar ratio of ethylene oxide to the compound to be oxyethylated is in general from 1:1 to 30:1. Reaction products of $C_{12}$–$C_{15}$-alkanols (oxo-alcohols) with 4–5 moles of ethylene oxide and 6–20 moles of propylene oxide per mole of alkanol may also be used.

Preferred anionic surfactants are the alkali metal salts and ammonium salts of abietic acid, of rosin, of hydrogenated rosin, of dimerized rosin and of di-$C_3$–$C_8$-alkylnaphthalene-2-sulfonic acid.

Preferred non-ionic surfactants are the N-(hydroxy-$C_2$–$C_4$-alkyl)-amides of $C_{16}$–$C_{20}$-fatty acids, $C_{12}$–$C_{16}$-fatty alcohols, and the reaction products of 1 mole of rosin with from 30 to 40 moles of ethylene oxide, of 1 mole of $C_{12}$–$C_{20}$-fatty alcohols, eg. tallow alcohol, with from 20 to 40 moles of ethylene oxide, of 1 mole of nonylphenol with from 7 to 15 moles of ethylene oxide and of 1 mole of N-(hydroxy-$C_2$–$C_4$-alkyl)-amides of $C_{16}$–$C_{20}$-fatty acids with from 1 to 20 moles of ethylene oxide.

The pigment suspension obtained after oxidation may be worked up in a conventional manner. For example, the pigment is isolated by filtering or centrifuging, washed and dried. Drying is advantageously carried out under mild conditions, for example under reduced pressure at 40°–70° C.

A particularly easily dispersible pigment is obtained by freeze-drying the moist press cake.

A pigmentary form having virtually equally good properties is obtained if the oxidation of the leuco compound is carried out at from 40° to 100° C., preferably from 60° to 90° C., in the presence of a non-ionic surfactant or of a mixture of an anionic and a non-ionic surfactant, using mixing without shearing forces.

In this latter embodiment, suitable surfactants are those comprised in the groups mentioned above.

The amount of anionic surfactant is in this case advantageously from 0 to 10% by weight and the amount of non-ionic surfactant from 2 to 15% by weight, based on the leuco compound. Preferably, the amount of non-ionic surfactant is from 8 to 12% by weight, and preferably from 4 to 8% by weight, based on the leuco compound, of an anionic surfactant may be added to the mixture.

Preferred surfactants in this embodiment are:

(a) non-ionic surfactants: adducts of ethylene oxide with $C_{16}$–$C_{20}$-fatty acid amines, $C_{12}$–$C_{20}$-alkanols, rosin and $C_8$–$C_{20}$-alkylphenols, and $C_{12}$–$C_{20}$-alkanols per se;

(b) anionic surfactants: N-$C_{12}$–$C_{20}$-alkyl-N-methylaminoacetic acid, abietic acid, hydrogenated rosin, dimerized rosin, di-$C_1$–$C_8$-alkylnaphthalenesulfonic acid and $C_{12}$–$C_{20}$-fatty acids in the form of the alkali metal salts.

The pigment suspension may be worked up (including isolation and drying) as described above.

The Examples which follow illustrate the process according to the invention. Parts and percentages in the Examples are by weight. Perylene-3,4,9,10-tetracarboxylic acid diimide is simply referred to as diimide in the Examples. The surface area of the pigments was determined by the nitrogen absorption method of Brunauer, Emmet and Teller, J.Amer.Chem.Soc. 60, 309 (1938) (BET method).

EXAMPLE 1

100 parts of crude diimide (prepared as described in BIOS No. 1,484, page 21) in the form of a moist press cake are introduced into 3,000 parts of water and the mixture is stirred until homogeneous. 160 parts of 50% strength sodium hydroxide solution and 80 parts of sodium dithionite are added at 40° C. and the mixture is stirred for 2 hours at this temperature. The color of the mixture changes to bluish violet. The salt of the leuco compound (ie. the vat salt) which has precipitated is filtered off and is washed with 3,000 parts of blank vat (containing 60 parts of 50% strength sodium hydroxide solution and 30 parts of sodium dithionite in 3,000 parts of water) until the filtrate is only pale violet.

A suspension of about 10% solids content is prepared by adding water to the moist filter cake of the leuco compound. An alkaline solution containing 10 parts of sodium rosin soap is added to the suspension and the mixture is stirred, after addition of 1,600 parts of glass beads of 0.8–1 mm diameter, for 5 hours by means of a high-speed stirrer (2,000 rpm), with access of air. The temperature is kept at 30°–40° C. by cooling, but towards the end is allowed to rise to 55° C. At this temperature, 100 parts of 30% strength hydrogen peroxide are added in the course of 1.5 hours, whilst stirring, and stirring is then continued for 30 minutes.

The beads are then sieved off and, to remove adhering colorant, are again suspended in 1,000 parts of water, and again separated off. The aqueous suspension of the colorant is acidified to pH 5 with 10% strength sulfuric acid and the colorant is filtered off and washed neutral. Freeze-drying of the product gives 90 parts of a reddish brown pigment which disperses very easily in baking finishes and gives transparent reddish brown colorations in full-shade formulations and strongly reddish violet colorations in white reductions, the fastness characteristics being excellent in each case.

75% of the pigment obtained is in the form of particles of 0.36 μm diameter or less. The surface area, determined by $N_2$ adsorption, is 41 $m^2/g$.

EXAMPLE 2

100 parts of crude diimide (prepared according to BIOS 1,484, page 21), in the form of the moist press cake, are converted to the leuco form and the press cake of the latter is freed from adhering mother liquor by washing with blank vet, the procedure followed being as described in Example 1.

The moist filter cake of the leuco form is stirred with water to give a paste having a solids content of 10%. 5 parts of oleic acid ethanolamide are added to the aqueous alkaline paste, and after adding 1,600 parts of glass beads of 0.8–1 mm diameter, the mixture is stirred by means of a high-speed stirrer (2,000 rpm) for 5 hours, with access of air. Towards the end, the temperature is allowed to rise to 55°–60° C. 100 parts of 30% strength hydrogen peroxide are then added continuously in the course of 1.5 hours whilst stirring, after which stirring is continued for 30 minutes. The mixture is worked up as described in Example 1. 89 parts of a reddish brown pigment are obtained; the product exhibits virtually the same properties as the pigment obtained in Example 1.

EXAMPLE 3

100 parts of crude diimide (obtained according to BIOS No. 1,484, page 21) are converted to the sparingly soluble leuco form by the method described in Example 1, and the press cake is freed from adhering mother liquor by washing with blank vat.

The moist filter cake of the leuco form is stirred with water to give a paste of 10% solids content, and 6 parts of tallow alcohol are added to the aqueous alkaline suspension. 1,600 parts of glass beads (diameter 0.1–1 mm) are then added and the mixture is stirred by means of a high-speed stirrer for 5 hours, with access of air. The further oxidation and working up are carried out as described in Example 1.

86 parts of a reddish brown pigment which has the same properties as the pigment prepared according to Example 1, are obtained.

EXAMPLE 4

100 parts of crude diimide (obtained according to BIOS No. 1,484, page 21) are converted to the leuco form by the method described in Example 1, and the press cake is freed from adhering mother liquor by washing with blank vat.

The moist filter cake of the leuco form is milled with glass beads as described in Example 1. However, 5 parts of sodium diisobutylnaphthalene-1-sulfonate were added before milling.

The further oxidation and working up are carried out as described in Example 1.

88 parts of a reddish brown pigment which has the same properties as the pigment prepared according to Example 1 are obtained. The surface area, determined by $N_2$ adsorption, is 65 $m^2/g$.

EXAMPLE 5

100 parts of crude diimide (prepared according to German Laid-Open Application DOS 1,619,531, Example 8, lines 1–6 (crude pigment)), in the form of a moist press cake, are introduced into 3,000 parts of water and the mixture is stirred until homogeneous. 160 parts of 50% strength sodium hydroxide solution and 80 parts of sodium dithionite are added at 40° C. and the mixture is then stirred for 2 hours at this temperature. The sparingly soluble vat salt wwhich precipitates is filtered off and the filter cake is washed with 500 parts of blank vat (containing 10 parts of 50% strength sodium hydroxide solution and 5 parts of sodium dithionite).

The moist filter cake of the leuco form is converted to a paste, having a solids content of about 10% by adding water. An alkaline solution of 15 parts of sodium rosin soap is added to the aqueous alkaline paste, and after adding 1,600 parts of glass beads (diameter 0.8–1 mm) the mixture is stirred by means of a high-speed stirrer (2,000 rpm) for 5 hours, with access of air.

The further oxidation and working up are carried out as in Example 1. The moist pigment is dried at 60° C. under reduced pressure.

98 parts of a reddish brown pigment, which has similar tinctorial properties to those of the pigment prepared according to Example 1, are obtained. The dispersibility of the pigment obtained is somewhat less good than that of the pigments obtained according to Examples 1 to 4, but substantially better than that of the corresponding prior art pigments. The surface area, determined by nitrogen adsorption, is 32 $m^2/g$.

EXAMPLE 6

100 parts of crude diimide (prepared according to BIOS No. 1,484, page 21) in the form of a moist press cake, are stirred into water and converted to the leuco compound as described in Example 1. The leuco compound is then isolated and washed with blank vat.

The moist filter cake of the leuco compound is introduced into 4,000 parts of water at 70° C., in which 5 parts of an adduct of 1 mole of rosin with 40 moles of ethylene oxide, and 10 parts of tallow alcohol, have been dispersed. 40 parts of 30% strength hydrogen peroxide are then added in the course of 15 minutes, after which the suspension is stirred for 1 hour at 70° C. It is then brought to pH 5 with 10% strength sulfuric acid and the pigment is filtered off and washed neutral. The filter residue is dried under reduced pressure at 70° C. Yield: 92 parts of pigment. The pigment is easily dispersible in baking finishes and in full-shade formulations gives brilliant transparent reddish brown colorations. In white reductions, reddish violet colorations are obtained, which are substantially bluer compared to colorations obtained with pigments of examples 1–5.

EXAMPLE 7

100 parts of crude diimide (prepared according to BIOS No. 1,484, page 21) are converted to the leuco compound as described in Example 1, and this compound is isolated and washed.

The moist leuco compound is introduced into 4,000 parts of water at 70° C., in which an alkaline solution of 5 parts of sodium rosin soap and 5 parts of tallow alcohol have been dispersed. 40 parts of 30% strength hydrogen peroxide are added in the course of 15 minutes at 70° C. and the mixture is stirred at this temperature for 1 hour. It is then acidified to pH 5 and the pigment is filtered off, washed neutral and dried under reduced pressure at 70° C. Yield: 93 parts. The pigment disperses easily in a baking finish and in full-shade formulations gives brilliant, transparent reddish brown colorations. In white reductions, distinctly more bluish colorations are obtained than with the pigments obtained according to Examples 1 to 5.

Compared to the prior art pigments, the coloration is substantially more reddish.

EXAMPLE 8

100 parts of crude diimide (prepared according to BIOS 1,484, page 21) are converted to the leuco compound as described in Example 1, and this compound is isolated.

The filter residue is stirred with water and the suspension is brought to a solids content of 10%. 5 parts of sodium dithionite, followed by 10 parts of oleic acid ethanolamide, are added to the suspension. 1,600 parts of glass beads (diameter 0.8–1 mm) are then added and the suspension is stirred for 5 hours by means of a high-speed stirrer (2,000 rpm), with access of air. At the end the temperature is 60° C. At this temperature, 100 parts of 30% strength hydrogen peroxide are added continuously during the course of 1.5 hours, whilst stirring, and stirring is then continued for 30 minutes. The pigment is worked up as described in Example 1, except that the moist pigment is dried under reduced pressure at 60° C. Yield: 92 parts of a reddish brown pigment which has similar properties to those of the pigment obtained according to Example 5. The surface area is found to be 35 $m^2/g$.

We claim:

1. A process for the preparation of a pigmentary form of perylene-3,4,9,10-tetracarboxylic acid diimide, which gives brilliant, transparent and reddish colorations, wherein crude perylenetetracarboxylic acid diimide is formed into the leuco compound by reaction with an alkali metal dithionite in the presence of an alkali metal hydroxide and said leuco compound is then oxidized in an aqueous suspension either in the presence of a surfactant at from 20° to 100° C. or with exposure to shearing forces in the presence of a surfactant at from 20° to 100° C.

2. The process as claimed in claim 1, wherein the leuco compound is isolated and optionally washed and the isolated leuco compound is oxidized in aqueous suspension.

3. The process as claimed in claim 1 or 2 wherein the oxidation is carried out at from 40° to 80° C.

4. A process as claimed in claim 1 or 2, wherein the oxidation is carried out in the presence of from 0.5 to 15% by weight, based on the leuco compound, of a non-ionic surfactant or a mixture of an anionic surfactant and a non-ionic surfactant.

5. A process as claimed in claim 4, wherein thhe anionic surfactants used are alkali mmetal salts or ammonium salts of abietic acid, of rosin, of hydrogenated or dimerized rosin or of di-$C_3$–$C_8$-alkylnaphthalene-2-sulfonic acids non-ionic surfactants used are, $C_{12}$–$C_{16}$-fatty alcohols, N-(hydroxy-$C_2$–$C_4$-alkyl)-amides of $C_{16}$–$C_{20}$-fatty acids or reaction products of ethylene oxide with rosin, $C_{12}$–$C_{20}$-fatty alcohols or N-(hydroxy-$C_2$–$C_4$-alkyl)-amides of $C_{16}$–$C_{20}$-fatty acids.

6. The process as claimed in claim 1 or 2, wherein air or hydrogen perioxide is used as the oxidizing agent.

7. A process for the preparation of a pigmentary form of perylene-3,4,9,10-tetracarboxylic acid diimide, which gives brilliant, transparent and reddish colorations, wherein the crude perylenetetracarboxylic acid diimide is converted to the leuco compound and the latter is then oxidized in an aqueous suspension in the absence of shearing forces and in the presence of a non-ionic surfactant or of a mixture of a non-ionic and an anionic surfactant at from 40° to 100° C.

8. The process as claimed in claim 7, wherein the leuco compound is oxidized in the presence of from 2 to 15% by weight of a non-ionic surfactant and from 0 to 10% by weight of an anionic surfactant, the percentages being based on the leuco compound.

9. The process as claimed in claim 8, wherein the anionic surfactants used are $C_{12}$–$C_{18}$-alkyl-N-methyl-aminoacetic acids, alkali metal salts of abietic acid, of hydrogenated or dimerized rosin, of dialkyl-naphthalence-2-sulfonic acids or of fatty acids and the non-ionic surfactants used are adducts of ethylene oxide with $C_{16}$–$C_{20}$-fatty acid amides, with $C_{12}$–$C_{20}$-fatty alcohols, with rosin or with nonylphenol, or $C_{12}$–$C_{20}$-fatty alcohols.

10. The process as claimed in claim 7 or 8, wherein the oxidation is carried out at from 60° to 90° C.

11. The process as claimed in claim 7, wherein air or hydrogen peroxide is used as the oxidizing agent.

* * * * *